United States Patent [19]

Emry, Jr. et al.

[11] Patent Number: 4,571,700

[45] Date of Patent: Feb. 18, 1986

[54] PAGE INDEXING SYSTEM FOR ACCESSING SEQUENTIALLY STORED DATA REPRESENTING A MULTI-PAGE DOCUMENT

[75] Inventors: Carl A. Emry, Jr., Round Rock; Grover H. Neuman; Lynda K. Mersiovsky, both of Austin, all of Tex.; Margaret S. Pfeuffer, Raleigh, N.C.

[73] Assignee: International Business Machines Corporation, Armonk, N.Y.

[21] Appl. No.: 504,825

[22] Filed: Jun. 16, 1983

[51] Int. Cl.[4] ............... G06F 12/00; G06F 13/00; G06F 15/40

[52] U.S. Cl. .................................. 364/900; 400/61; 400/83

[58] Field of Search ....... 364/200 MS FILE, 900 MS FILE, 364/518; 360/72.1, 72.2; 353/25, 26 A; 400/61, 83; 355/3 R; 358/256

[56] References Cited

U.S. PATENT DOCUMENTS

| | | | |
|---|---|---|---|
| 3,647,348 | 3/1972 | Smith et al. | 444/1 |
| 4,024,508 | 5/1977 | Bachman et al. | 340/172.5 |
| 4,056,809 | 11/1977 | Hoerning et al. | 364/200 |
| 4,104,717 | 8/1978 | Fujimura | 364/200 |
| 4,139,898 | 2/1979 | Tanaka | 364/900 |
| 4,161,036 | 7/1979 | Morris | 364/900 |
| 4,250,560 | 2/1981 | Dethloff | 364/900 |
| 4,321,670 | 3/1982 | Timmons | 364/300 |
| 4,357,638 | 11/1982 | Yoshimaru | 360/72.2 |
| 4,445,195 | 4/1984 | Yamamoto | 364/900 |
| 4,453,217 | 6/1984 | Boivie | 364/300 |
| 4,468,755 | 8/1984 | Iida | 364/900 |
| 4,485,454 | 11/1984 | Kimoto | 364/900 |
| 4,498,107 | 2/1985 | Yoshimura et al. | 358/256 |
| 4,506,342 | 3/1985 | Yamamoto | 364/900 |
| 4,522,482 | 6/1985 | Pettigrew et al. | 355/3 R |

*Primary Examiner*—James D. Thomas
*Assistant Examiner*—Archie E. Williams, Jr.
*Attorney, Agent, or Firm*—James A. Kunkle; Julius B. Kraft; J. Jancin, Jr.

[57] ABSTRACT

A document indexing method and apparatus facilitates access to sequentially stored documents in a word processing system. The invention uses random access memory in the word processor to build a page index when the sequential data stream is first processed. The page index is then available so that subsequent access to previously processed pages is faster than conventional sequential access. The page index has associated with it an offset index having pointers to the actual entries in the page index. If the page index proves too small to store a index entry for every single page of a document, the offset index is reorganized to point to every other entry in the page index. Reorganization effectively doubles the span of pages covered by the page index and may be repeated a plurality of times to allow a sequentially stored document of arbitrary length to be indexed by a fixed length page index.

5 Claims, 7 Drawing Figures

PAGE INDEXING SYSTEM FOR ACCESSING SEQUENTIALLY STORED DATA REPRESENTING A MULTI-PAGE DOCUMENT

TECHNICAL FIELD

The invention pertains to a document indexing method and apparatus used to expedite access to sequentially stored documents, for example, in a word processing system.

BACKGROUND ART

In the field of word processing, certain data stream conventions have been devised to facilitate various editing, display, printing, or communication functions performed by a word processing station. Among the many conventions adopted in the history are revisable data streams and printable data streams.

Revisable data streams are stored, for example on a magnetic diskette, in such a way that they may be randomly accessed by page name or number for ease in editing and for processing portions of the document. This random accessing requires certain types of information to be available for each document page including the location of the boundaries between the pages on the diskette and the format of the page (e.g., tabs, fonts, and indents). The locations of the boundaries between the pages are typically stored on the diskette in a dedicated area called the named record index while the format is stored at the top of each page.

Printable data streams were devised to allow less complex output functions, including printing and communication, without the burdensome function of editing. Printable data streams are stored on a diskette sequentially without the aforementioned two types of information. To find a given page within the printable data stream, the stream must be read sequentially from the start of the document keeping track of page boundaries and of the page format information as it changes.

Heretofore, if a user wished to browse a printable data stream, for example to check the integrity of a document received over communication lines, they were left with two choices. A user could convert the printable data stream into a revisable data stream and then browse using a random access method, or a user could sequentially browse the printable data stream. The former method requires a time consuming conversion and may require the storage of two data streams for a single document. The latter method requires a document to be scanned from the beginning each time a new document page is accessed.

The time delays and inefficient storage allocation associated with document conversion and with sequential scanning become significant when the document is long, such as a report or legal brief. It is therefore desirable to expedite the access of specific pages of a sequentially stored document without substantially increasing storage requirements.

SUMMARY OF INVENTION

The invention as herein described and claimed solves the aforementioned problems by reducing the time for accessing single pages in documents sequentially stored, for example, on a magnetic diskette, without the storage of two data streams. The preferred embodiment uses random access memory (RAM) in the word processor to build a page index when the sequential data stream is first processed. This page index is then available so that subsequent access to previously processed pages is faster than conventional sequential access.

After initial processing, the page index contains entries for each page processed, with each entry giving the record number on the diskette where the page starts along with all formatting information necessary to display the page. The page index has associated with it an offset index which is organized by page number and which contains pointers to the actual entries in the page index. The page numbers are not stored in the offset index but a given page number yields an increment into the offset index which, in turn, yields a pointer to the page index.

In the preferred embodiment, only a small amount of RAM is used to store the page index allowing only a small fixed number of locations and formats of pages to be included in the page index. If the page index proves too small to store an index entry for every single page of a document, the offset index is reorganized to point to every other entry in the page index.

By this method, alternating entries in the page index are retained, and all remaining entries of the page index are freed for re-use. This procedure effectively doubles the span of pages covered by the page index by eliminating even numbered index entries during each reorganization of the offset index.

The reorganization of the offset index may be repeated as many times as necessary to allow a sequentially stored document of arbitrary length to be indexed by the fixed length page index.

When accessing a page of a previously processed sequentially stored document, the offset index is checked to determine if the requested page has a corresponding entry in the page index. If the requested page has an entry in the page index, the diskette location and format are taken from the page index and used to fetch and display the requested page. If the requested page does not have a corresponding entry in the page index, the diskette location and format of the next lower numbered page found in the page index is taken and used as a starting point to sequentially search the stored document for the requested page. The requested page is then fetched from the diskette and displayed.

The invention therefore allows fast access to individual pages of a sequentially stored document of arbitrary length by using a fixed amount of RAM as a page index. The sequentially stored documents are uniformly covered up to the highest page of the document by the RAM page index to provide fast access to any page of the document.

When a requested page has no corresponding entry in the page index, the invention automatically finds the next lower numbered page that has an entry in the page index and sequentially searches the document for the requested page starting the search from that next lower numbered page. This results in much faster page access than would be possible by sequentially searching the document from the beginning each time a new page is accessed.

The foregoing and other features, objects, and advantages of the invention will be apparent to one skilled in the art from the following more particular description of the preferred embodiment of the invention, as illustrated in the accompanying drawings.

BRIEF DESCRIPTION OF THE DRAWINGS

FIG. 5 is a schematic representation of a seven location offset index with a corresponding page index.

DESCRIPTION OF THE INVENTION

Figure 1:
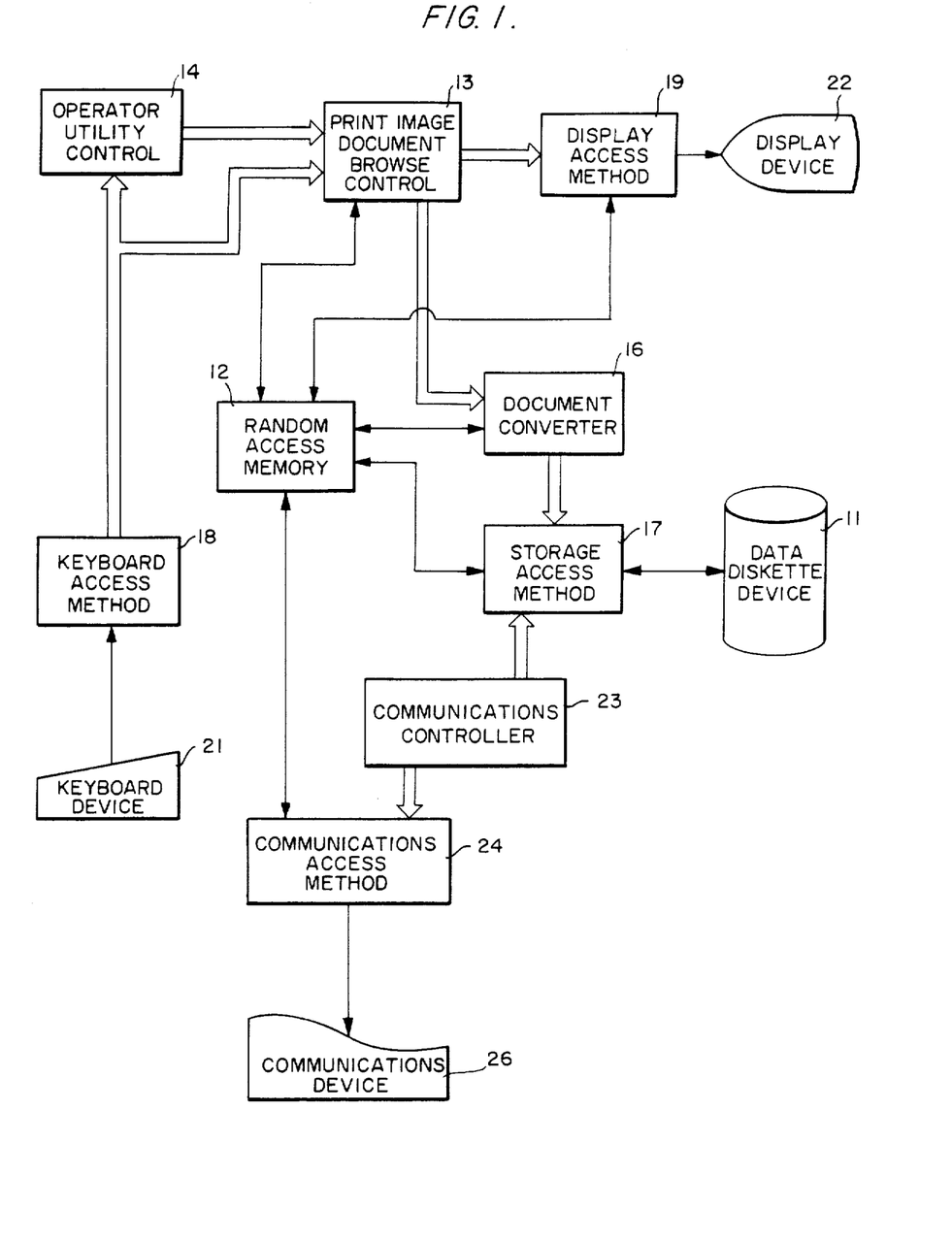
FIG. 1 is a block diagram of the functional units of a word processing system which relate to the present invention.

Referring to FIG. 1, various functional components of a word processing system are shown which allow sequential data stored on data diskette device 11 to be randomly accessed. The single line arrows represent the flow of data and the double line arrows represent the flow of control and data. The components include, a random access memory (RAM) 12, print image document browse control 13, operator utility control 14, document converter 16, as well as storage access method 17, keyboard access method 18, and display access method 19. Several peripheral devices are also shown including keyboard 21, data diskette device 11, and display device 22. In addition, a communications controller 23 is provided which interfaces with storage access method 17 and communications access method 24. A communications device 26 interfaces with communications access method 24. Communications device 26 can be a printer or a modulator-demodulator, or other communicator.

Figure 2:
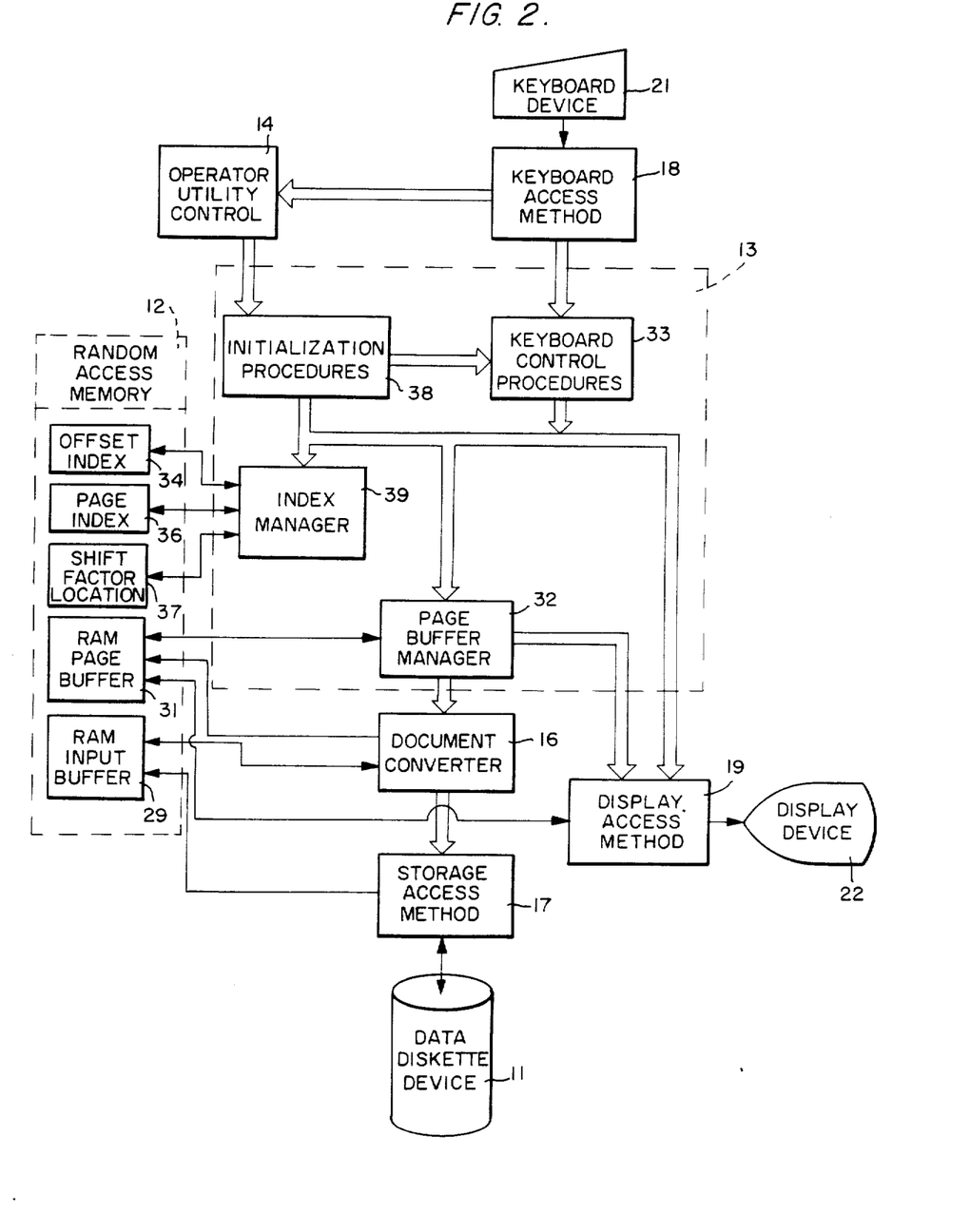
FIG. 2 is a block diagram of the functional units of the print image document browse control, random access memory, operator utility control, and the storage, display, and keyboard access methods of FIG. 1.

RAM 12 contains an offset index 34, page index 36, shift factor location 37, RAM page buffer 31, and RAM input buffer 29 (all shown in FIG. 2). As shown in FIG. 1, RAM 12 interfaces with communications access method 24, document converter 16, display access method 19, storage access method 17 and print image document browse control 13.

Document converter 16 provides an interface between a component using a printable data stream and a component using a revisable data stream. For example, if a page coded as a printable data stream is stored on data diskette device 11, the page must be converted to a revisable data stream before being displayed by display device 22. Converter 16 performs the conversion of the printable data stream to a revisable data stream by scanning the sequential printable data for page boundaries and for format information. Converter 16 then restructures the sequential data into page oriented data with each page location identified along with format information needed to display each page.

For displaying sequentially stored data, this conversion is begun by storage access method 17 transferring sequential data from diskette device 11 to RAM input buffer 29 (FIG. 2). Document converter 16 then converts the data in RAM input buffer 29 from a printable data stream to a revisable data stream, and stores the revisable data in RAM page buffer 31. From page buffer 31, the revisable data stream passes to page buffer manager 32 within print image browse control 13. The revisable data stream then passes from page buffer manager 32 to display access method 19 and onto display 22 for operator viewing.

Storage access method 17 is a collection of programs which interface various components of the system with the data diskette device. Whenever, in the process of acquiring an input data stream, converter 16 makes a request, storage access method 17 requests the data from the diskette and transfers the data to RAM input buffer 29 in RAM 12 (FIG. 2). The input data can then be accessed for processing by converter 16.

The keyboard access method 18 is a collection of programs which interface various components of the system with keyboard device 21. The system operator keys the primary input into the system through keyboard 21. Keyboard 21 has indirect control of the display process through the keyboard control procedures 33 (FIG. 2) within browse control 13. Keyboard control procedures 33 control the access and display of requested pages entered by the operator through keyboard 21. Once the operator requests a page, control is taken by keyboard control procedures 33 and no further operator input is required for display of the requested page.

Keyboard 21 also interfaces with operator utility control 14 which is activated whenever an operator initially requests the display of a sequentially stored document. Detailed operation of operator utility control 14 and keyboard control procedures 33 will be discussed below.

The communications access method 24 is a set of programs which interface to communication device 26. Communications access method 24 takes data from communications device 26, places it in RAM 12 and moves it to diskette device 11 through storage access method 17 under control of communications controller 23. Communications access method 24 also moves data from the system to communications device 26 for printing or for transmission.

Display access method 19 is a set of programs which interface to display device 22. Data is taken from RAM page buffer 31 by page buffer manager 32 (both shown in FIG. 2) and transferred to display access method 19 for operator viewing on display device 22.

It is print image document browse control 13 which implements the solution of the present invention. Referring to FIG. 2, the operator of the system requests the display of a sequentially stored document by entering the request on keyboard 21 which is transferred to operator utility control 14.

Operator utility control 14 contains a set of programs which interface keyboard access method 18 with initialization procedures 38. Upon the transfer of a request for a new document from keyboard access method 18, operator utility control 14 indicates to initialization procedures 38 that a sequentially stored document is being accessed. Initialization procedures 38 contains programs that set various initial conditions throughout the system in preparation for browsing a sequentially stored document. These initial conditions include clearing indexes 34, 36 and shift factor location 37, through index manager 39, and initializing keyboard control procedures 33.

Keyboard control procedures 33 are a set of programs that accept control from keyboard access method 18 to control the browse of a sequentially stored document for a requested page. Once control is taken by keyboard control procedures 33 from keyboard access method 18, no further input is required from the system operator to display the required page.

After receiving a request for a sequential document from keyboard access method 18, control procedures 33 causes the first page of the requested document to be fetched from diskette device 11 by storage access method 17 transferring control through page buffer manager 32 and document converter 16.

The first page of the sequential document is converted from a printable data stream to a revisable data stream by converter 16 using buffers 31 and 29 as described above. The first page is then displayed on display device 22 and the diskette location and format of the first page is stored in the first position of page index 36 by index manager 39. At the same time, the first entry of offset index 34 is set by index manager 39 to point to the first entry of page index 36.

After the document is requested and the first page is displayed, keyboard control procedures 33 await further operator requests for the display of other pages within the selected document. When other pages are requested for display, control procedures 33 transfer control to index manager 39 to determine if the requested page is in the page index and to determine if the requested page can be added to the page index.

Figure 3:
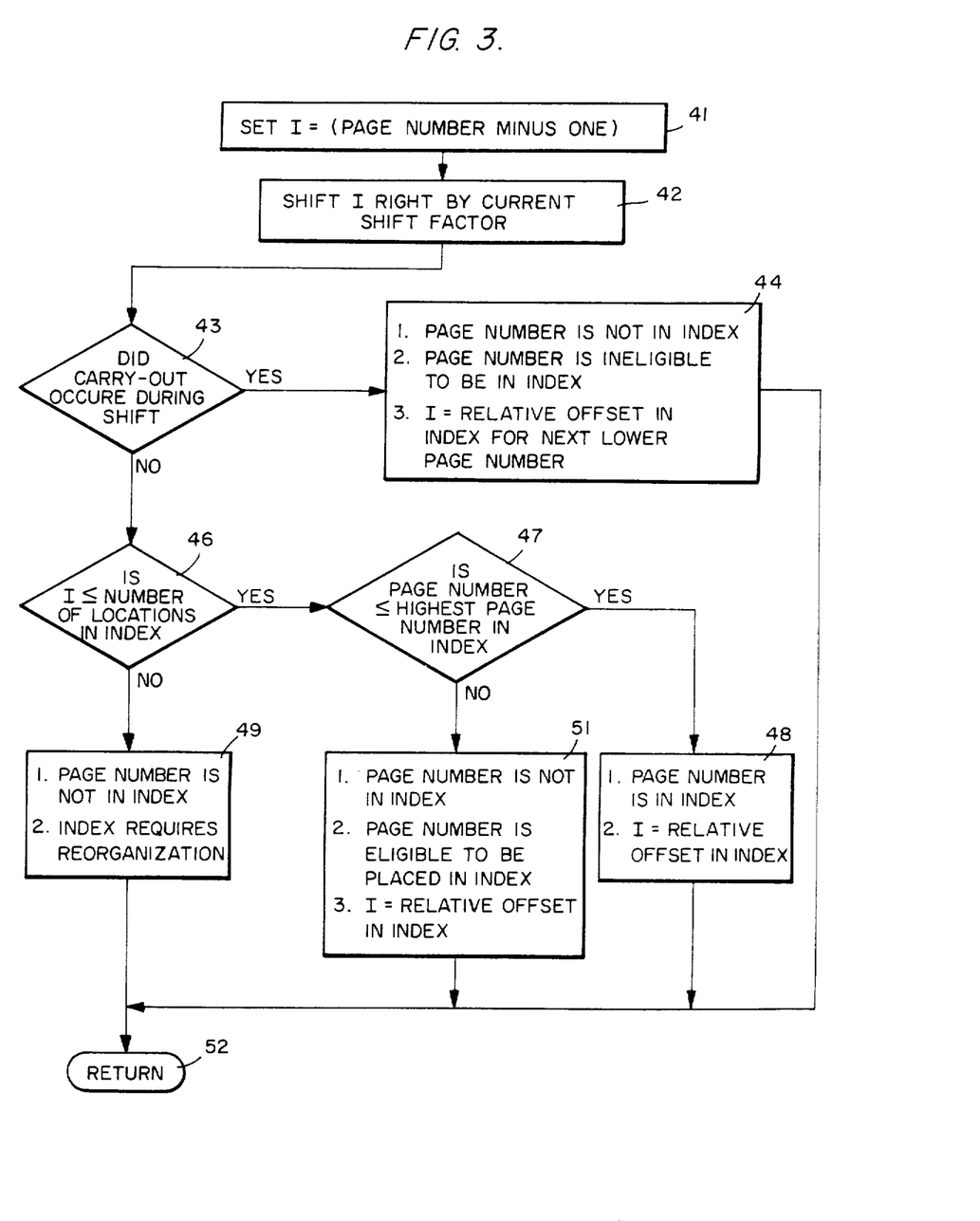
FIG. 3 is a flow chart of the logic of the page locate/add subroutine.

The routine performed by index manager 39 each time a new page is requested is shown in flow chart form in FIG. 3.

Referring to FIGS. 2 and 3, function block 41 sets variable I to the number of the requested page minus one. Function block 42 shifts the binary value of variable I to the right by the current value of shift factor obtained from shift factor index 37. Shifting the binary value of a decimal number to the right one space is equivalent to dividing the decimal number by two. The shift factor is initially the value zero, and is incremented by one each time offset index 34 is reorganized. The reorganization of offset index 34 is the subject of FIG. 4 and is discussed below.

Decision block 43 checks if there has been a carry-out during the shift or shifts performed in function block 42. If a carry-out has occurred, then in function block 44, the requested page is concluded not to be in the page index, and the requested page is concluded to be ineligible to be added to page index 34. In addition, the shifted value I provides an increment into offset index 34 which, in turn, points to an entry in page index 36 corresponding to the next lower numbered page from the requested page.

From function block 44, control is then returned to a higher level process (not shown) by block 52.

If decision block 43 detects no carry-out, decision block 46 checks to see if variable I is less than or equal to the number of storage locations in offset index 34. If not, function block 49 concludes that the requested page is not in page index 36 and that offset index 34 requires reorganization. From block 49, block 52 transfers control to the reorganization subroutine shown in FIG. 4.

If decision block 46 determines that variable I is less than or equal to the number of storage locations in offset index 34, decision block 47 checks if the requested page number is less than or equal to the highest page number indexed in offset index 34. If so, function block 48 concludes that the requested page number is in page index 36 and that variable I is the relative offset into offset index 34. In other words, considering the top storage position of offset index as position zero, the Ith entry in offset index 34 points to the entry in page index 36 that contains the diskette location and format information for the requested page. From block 48, control is returned to a higher level process, (not shown) by block 52.

If decision block 47 determines that the requested page number is greater than the highest page number presently stored in offset index 34, function block 51 concludes that the requested page is not in offset index 34 but that it is eligible to be placed in index 34. Also, block 51 concludes that variable I represents the relative offset into offset index 34 to find an entry which points to the storage location in page index 36 for storing the diskette location and format information of the requested page. From block 51, control is returned to a higher level process (not shown) by block 52.

As mentioned above, function block 49 concludes that a reorganization of offset index 34 is required. Reorganization is necessary when offset index 34 is full before a selected document has been completely indexed.

Figure 4:
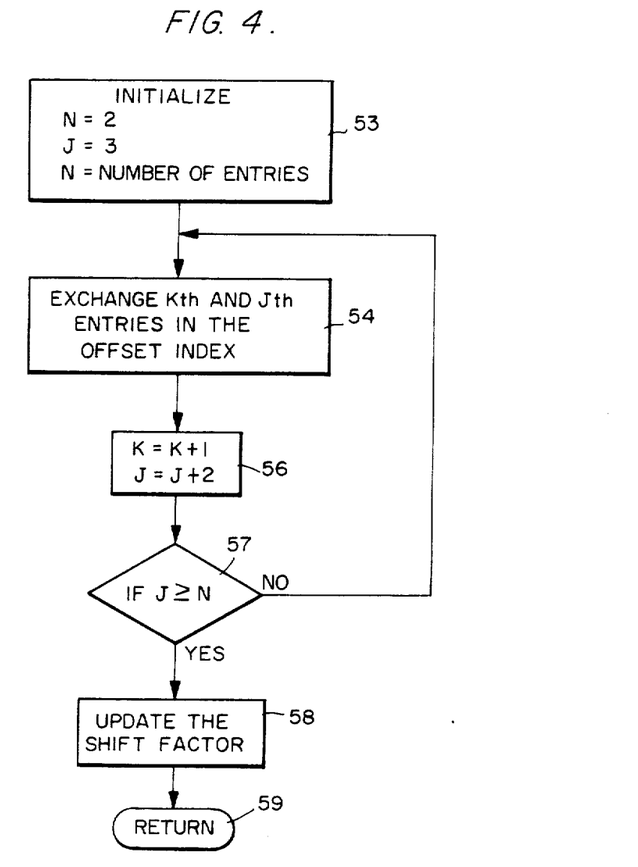
FIG. 4 is a flow chart of the logic of the offset index reorganization subroutine.

The reorganization subroutine is shown in FIG. 4 and can be understood with reference to FIGS. 2 and 4. When the reorganization subroutine is initiated, function block 53 initializes several variables used within the subroutine. Variables K and J are set to the values 2 and 3 respectively, and variable N is set to the number of storage locations in offset index 34.

Control is then transferred to function block 54 where the $K^{th}$ entry and the $J^{th}$ entry of offset index 34 are exchanged. For the first pass through the loop in the reorganization subroutine, the second and third entries are exchanged.

Control is then transferred to function block 56 where variable K is incremented by one and variable J is incremented by two. For the first pass through the loop, block 56 sets variables K and J to the values 3 and 5 respectively. Decision block 57 then checks if variable J is greater than or equal to variable N. If not, control is returned to function block 54 for offset index entry exchange.

The subroutine loop is followed until decision block 57 determines that the end of offset index 34 has been reached. This is evidenced by variable J being greater than or equal to variable N. When the end of offset 34 has been reached, the shift factor is incremented by one in function block 58, and stored in shift factor location 37. Control is then returned to a higher level process (not shown) by block 59.

The procedure effectively doubles the span of pages covered by page offset index 34. The reorganization of the offset index may be repeated as many times as necessary to allow a sequentially stored document of arbitrary length to be indexed by the fixed length page index.

The effect of reorganization can be seen by referring to FIG. 5. FIG. 5 shows an offset index and a page index each with seven entries. FIG. 5 is used for illustrative purposes, and will not be construed to limit the invention in any manner. In practical applications, both indexes typically have many more than seven entries.

Each entry in the page index has two portions. The first portion provides the diskette location of the indexed page, and the second portion gives the format of the page necessary for display of the page. A single entry in the page index is often called a page entity and includes both page location and page format information.

Figure 5A:
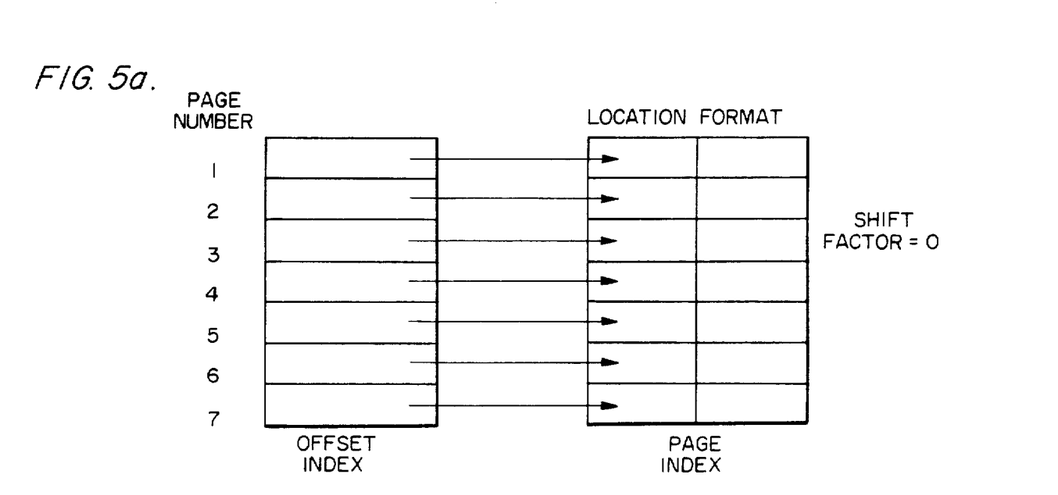
FIGS. 5a, b and c show the indexes before reorganization, after one reorganization and after two reorganizations, respectively.

FIG. 5(a) is a view of both indexes before any reorganization has occurred. All entries of the offset index point straight across to a corresponding entry in the page index. Page numbers are shown to the left of the offset index and, as can been seen, up to seven sequential pages can be indexed without reorganization.

The entering of page one into the first position of the offset index and page index is performed when the document is first requested for browsing by the system operator. The entering of pages two through seven is accomplished by index manager 39 performing the page location/add subroutine of FIG. 3. When page eight of the document is processed, function block 49 (FIG. 3) eventually gains control and concludes that reorganization is necessary. The reorganization subroutine of FIG. 4 is then initiated, the completion of which results in the index configuration shown in FIG. 5(b).

Figure 5B:
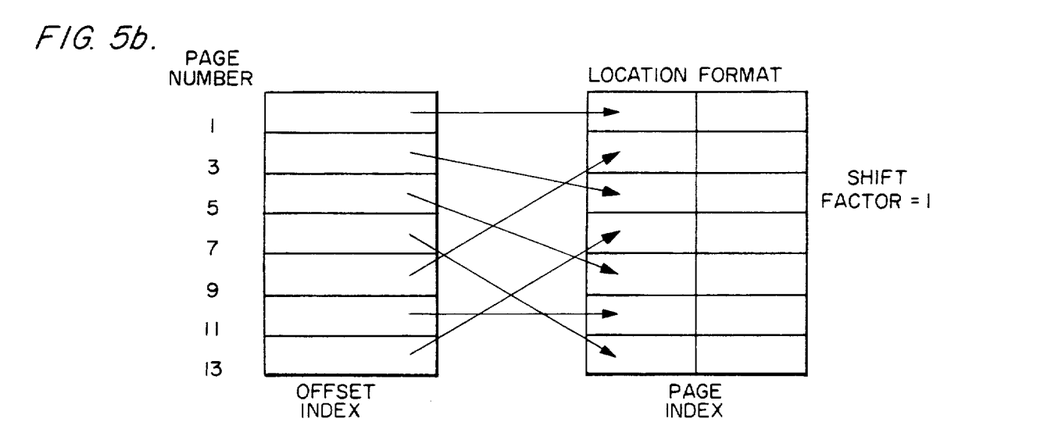

The offset index of FIG. 5(b) spans twice as many pages as the offset index of FIG. 5(a). Referring to FIG. 5(b), the first four entries of the offset index point to entries one, three, five and seven, respectively, of the page index which contain location and format information for pages one, three, five and seven. Offset index locations five through seven point to locations two, six, and four, respectively, of the page index which are now free for re-use. After the shift factor is incremented by one, reorganization is complete.

Continuing with the processing of page eight, and referring to FIG. 3, control passes from block 41 to blocks 42, 43, and 44. Block 44 concludes that page eight is not eligible to be in the offset index of FIG. 5(b), and that variable I, which is three, is used to locate the entry of the offset index corresponding to the next lower numbered page. This entry is the fourth entry of the offset index which corresponds to page seven and which points to the seventh entry of the page index. The diskette location of page seven is then used as a starting location to search the diskette for requested page eight.

When page nine of the document is requested for viewing by the operator, control is passed from block 41 to blocks 42, 43, 46, 47, and 51 of FIG. 3. Block 51 concludes that page nine is not yet in the offset index of FIG. 5(b), that page nine will fit in the index, and that I, the value 4, is used to find the location in the offset index for page nine. This location is location 5 of the offset index which points to the second entry of the page index which is where the diskette location and format of page nine are to be stored.

The indexes of FIG. 5(b) will continue to be filled in this manner until page fifteen is requested. The request of page fifteen causes block 49 of FIG. 3 to again conclude that reorganization is necessary.

Figure 5C:
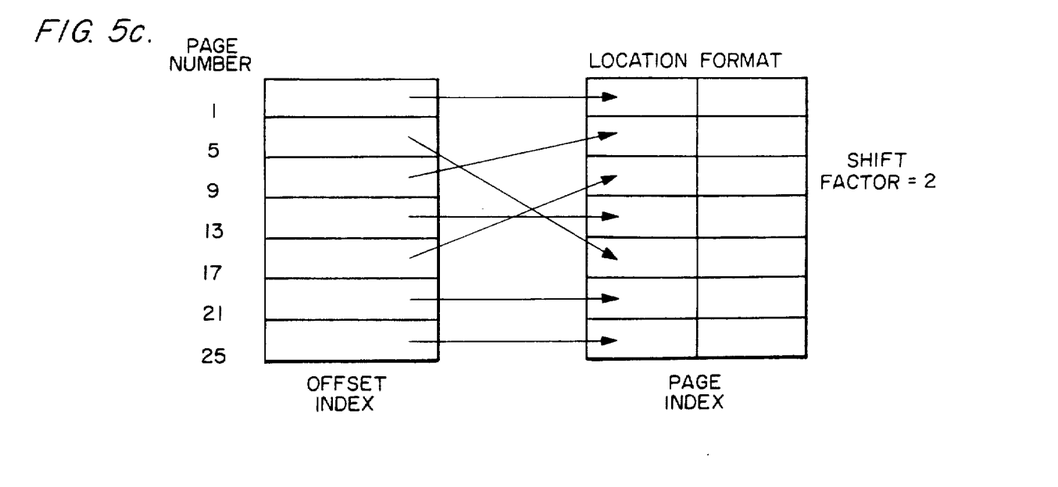

After a second reorganization is completed, the indexes appear as shown in FIG. 5(c) and the shift factor holds the value two. Filling the indexes continues until the page numbers shown to the left of the offset index in FIG. 5(c) are processed. A third reorganization occurs when page twenty-nine is requested.

Table I relates the shift factor to the sequence of pages entered in the offset index.

TABLE I

| Shift Factor | Pages Indexed |
|---|---|
| 0 | 1, 2, 3, 4, 5, 6, 7, 8, 9, 10, . . . |
| 1 | 1, 3, 5, 7, 9, 11, 13, 15, 17, 19, . . . |
| 2 | 1, 5, 9, 13, 17, 21, 25, 29, 33, |

TABLE I-continued

| Shift Factor | Pages Indexed |
|---|---|
| | 37, . . . |
| 3 | 1, 9, 17, 25, 33, 41, 49, 57, 65, 73, . . . |

As can be seen from Table I, the span of each entry of the offset index is doubled after each reorganization. For example, with a shift factor zero, page one indexes only one page; with a shift factor one, page one indexes pages one and two; and with a shift factor two, page one indexes pages one, two, three and four and so forth.

We claim:

1. A word processing and data accessing system for keeping track of page entities in a sequential data stream representative of a multipage document comprising:
   a first storage means for storing said data stream;
   a second storage means connected to said first storage means and to a document converter;
   said second storage means including a page index having a fixed number of positions for storing the locations of said page entities in said stored data stream by being set to the address in which selected pages of said data stream have been stored in said first storage means;
   said document converter means connected to said first storage means and to said second storage means for determining the page entities of said document in said stored data stream;
   an index manager connected to said second storage means for monitoring of said second storage means to recognize a request for a page in said first storage means which is beyond the present addressing capacity of said fixed number of storage positions in said page index;
   said index manager reorganizing said page index by altering selected addresses to increase the number of page entities represented by each storage position in said page index.

2. The word processing and data accessing system according to claim 1 further including an offset index in said second storage means for maintaining the page locations of the positions of the entries in said page index means;
   said page index being reorganized by said offset index keeping alternate positions in an unchanged condition and freeing all remaining positions for storage of the next series of odd page numbers, each entry in said series being controlled by a shift factor which starts at zero and is increased by one for each time that said page index is reorganized, said series beginning at the next odd number higher than the highest page number which has been kept in an unchanged condition in said offset index to allow doubling of the number of page entities represented by each storage position in said page index.

3. A method for maintaining an index of page entities in a sequential data stream representative of a multipage document including the steps of:
   storing said sequential data stream in a first storage;
   determining the locations of the page entities within said sequential data stream;
   storing the addresses of selected ones of said page entities in a second storage having a fixed number of positions for storage of a page entity in each position;

storing page entity locators of said second storage in a third storage which has a number of locator positions equal to the fixed number of positions for storage of page entities in said second storage;

reorganizing said second and third storage means by erasing selected positions of said page entity locators in said third storage means thereby releasing each page entity position in said second storage relating to said erased page entity locator in said third storage;

entering new storage page entities into released positions in said second storage;

entering new page entity locators into said third storage which are higher numbered than said erased locators;

increasing the number of pages spanned by said second storage means by said reorganization.

4. The method according to claim 3 wherein the reorganization of said second storage means includes the steps of:

erasing alternate positions of said third storage means;

entering new page entity locators in said erased positions which are higher numbered than the highest numbered erased position;

doubling the number of pages spanned by said second and third storage means through the entering of a new page entity locator in each alternate position of said third storage means.

5. The method according to claim 4 wherein all odd numbered positions of said second store are dept unchanged and all even numbered positions of said second store are freed for storage of new page index location data.

* * * * *

UNITED STATES PATENT AND TRADEMARK OFFICE
CERTIFICATE OF CORRECTION

PATENT NO. : 4,571,700

DATED : February 18, 1986

INVENTOR(S) : C. A. Emry, Jr., et al

It is certified that error appears in the above-identified patent and that said Letters Patent is hereby corrected as shown below:

Claim 5 - Col. 10, line 13  "dept" should be --kept--.

Signed and Sealed this

Sixteenth Day of September 1986

[SEAL]

Attest:

Attesting Officer

DONALD J. QUIGG

Commissioner of Patents and Trademarks